United States Patent
Sano et al.

(10) Patent No.: US 6,702,883 B1
(45) Date of Patent: Mar. 9, 2004

(54) INK COMPOSITION AND INK SET EACH EXCELLENT IN COLOR REPRODUCTION AND LIGHT RESISTANCE, AND METHOD OF RECORDING WITH THESE

(75) Inventors: Tsuyoshi Sano, Nagano-Ken (JP); Kiyohiko Takemoto, Nagano-Ken (JP)

(73) Assignee: Seiko Epson Corporation, Tokyo (JP)

( * ) Notice: Subject to any disclaimer, the term of this patent is extended or adjusted under 35 U.S.C. 154(b) by 76 days.

(21) Appl. No.: 09/831,691

(22) PCT Filed: Sep. 12, 2000

(86) PCT No.: PCT/JP00/06221
§ 371 (c)(1),
(2), (4) Date: Jun. 27, 2001

(87) PCT Pub. No.: WO01/19931
PCT Pub. Date: Mar. 22, 2001

(30) Foreign Application Priority Data

Sep. 13, 1999 (JP) ............................................. 11-259054
Sep. 13, 1999 (JP) ............................................. 11-259072

(51) Int. Cl.$^7$ .......................... C09D 11/00; C09D 11/02
(52) U.S. Cl. ................ 106/31.6; 106/31.78; 106/31.81; 106/31.86; 106/494; 106/496; 106/498
(58) Field of Search ............................ 106/31.6, 31.78, 106/31.81, 31.86, 494, 496, 498; 427/466; 428/32.1; 347/100

(56) References Cited

U.S. PATENT DOCUMENTS

| | | | | |
|---|---|---|---|---|
| 5,846,306 A | * | 12/1998 | Kubota et al. | 106/31.75 |
| 6,140,019 A | * | 10/2000 | Sakurai et al. | 430/288.1 |
| 6,284,029 B1 | * | 9/2001 | Sano et al. | 106/31.6 |
| 6,322,188 B1 | * | 11/2001 | Sano | 347/15 |
| 6,368,774 B1 | * | 4/2002 | Sakurai et al. | 430/288.1 |
| 2002/0007765 A1 | * | 1/2002 | Sano et al. | 106/31.49 |
| 2002/0096085 A1 | * | 7/2002 | Gotoh et al. | 106/31.86 |
| 2002/0157569 A1 | * | 10/2002 | Takemoto et al. | 106/31.86 |

FOREIGN PATENT DOCUMENTS

| | | |
|---|---|---|
| EP | 0 778 321 A2 | 6/1997 |
| EP | 959111 | 11/1999 |
| JP | 1025440 | 1/1998 |
| JP | 1112508 | 1/1999 |
| JP | 290555 | 10/2000 |
| WO | 98 32802 A | 7/1998 |
| WO | 9905230 | 2/1999 |

OTHER PUBLICATIONS

Patent Abstracts of Japan 11012508 A, Jan. 1999.
Patent Abstracts of Japan 10025440 A, Jan. 1998.
Patent Abstracts of Japan 2000290555 A, Oct. 2000.

* cited by examiner

*Primary Examiner*—Helene Klemanski
(74) *Attorney, Agent, or Firm*—Ladas & Parry

(57) ABSTRACT

The present invention is directed to a yellow ink which can realize images possessing excellent color reproduction and waterfastness. Images possessing very excellent color reproduction and lightfastness can be realized by using a yellow ink composition comprising C.I. Pigment Yellow 128 and C.I. Pigment Yellow 110 as a colorant, or by using a yellow ink set comprising a first yellow ink composition containing C.I. Pigment Yellow 128 and a second yellow ink composition containing C.I. Pigment Yellow 110.

31 Claims, No Drawings

INK COMPOSITION AND INK SET EACH EXCELLENT IN COLOR REPRODUCTION AND LIGHT RESISTANCE, AND METHOD OF RECORDING WITH THESE

BACKGROUND OF THE INVENTION

1. Field of the Invention

The present invention relates to a yellow ink composition, an ink set, and a recording method using the same, which are excellent in a wide range of color reproduction and lightfastness

2. Background Art

Specific examples of pigments used in yellow inks include C.I. Pigment Yellow 1, 2, 3, 12, 13, 14, 16, 17, 73, 74, 75, 83, 93, 95, 97, 98, 109, 110, 114, 128, 129, 138, 139, 150, 151, 154, 155, 180, and 185.

Although pigments are colorants which are generally superior in lightfastness to dyes, ink compositions have been desired which can realize images possessing a higher level of lightfastness. Further, in some cases, pigments are inferior in color development to dyes, and, in addition, when printing is performed using the pigments on recording media, images obtained are often somewhat unsatisfactory in vividness.

Further, for color images formed using a plurality of ink compositions, the presence of even one color ink composition having poor lightfastness results in a change in hue of images which in its turn extremely deteriorates the quality of color images. Therefore, more closely controlled lightfastness is also required for the yellow ink composition.

Further, for color images formed using ink compositions, it is a common practice to use magenta ink, yellow ink, cyan ink, and, in addition, optionally black ink. Color mixing of yellow with cyan can reproduce a green color, color mixing of yellow with magenta can reproduce a red color, and color mixing of cyan with magenta can reproduce a blue color. For this reason, the development of an ink set, which can realize faithful reproduction of these colors, has been desired.

SUMMARY OF THE INVENTION

The present inventors have now found that the preparation of a yellow ink composition comprising two yellow pigments, i.e., C.I. Pigment Yellow 128 and C.I. Pigment Yellow 110, can realize yellow images having significantly improved color reproduction and lightfastness. The present inventor shave further found that the use of an ink set comprising two yellow ink compositions respectively containing two pigments, i.e., C.I. Pigment Yellow 128 and C.I. Pigment Yellow 110, and an ink set comprising a combination of these two yellow ink compositions with a cyan ink composition, a magenta ink composition, or a black ink composition can realize yellow images, green images, red images, and, in its turn, color images, possessing significantly improved color reproduction and lightfastness. The present invention has been made based on such finding.

Accordingly, it is an object of the present invention to provide a yellow ink composition, a color ink set, and a recording method using the same, which can realize yellow images and, in its turn, color images possessing excellent color reproduction and lightfastness.

According to a first aspect of the present invention, there is provided a yellow ink composition. This ink composition comprises at least C.I. Pigment Yellow 128 and C.I. Pigment Yellow 110 as a colorant.

According to a second aspect of the present invention, there is provided an ink set comprising a first yellow ink composition and a second yellow ink composition, wherein the first yellow ink composition comprises C.I. Pigment Yellow 128 as a colorant, and the second yellow ink composition comprises C.I. Pigment Yellow 110 as a colorant.

According to a third aspect of the present invention, there is provided an ink set comprising a yellow ink composition and a cyan ink composition, a magenta ink composition, or a black ink composition, wherein the yellow ink composition comprises a first yellow ink composition and a second yellow ink composition, the first yellow ink composition comprises C.I. Pigment Yellow 128 as a colorant, and the second yellow ink composition comprises C.I. Pigment Yellow 110 as a colorant.

DETAILED DESCRIPTION OF THE INVENTION

A. Yellow Ink Composition According to First Aspect of Present Invention

The yellow ink composition according to the present invention basically comprises C.I. Pigment Yellow 128 and C.I. Pigment Yellow 110 as a colorant. The formation of images using the yellow ink composition comprising these two yellow pigments can realize yellow images possessing excellent color reproduction and lightfastness.

According to a preferred embodiment of the present invention, the weight ratio of C.I. Pigment Yellow 128 to C.I. Pigment Yellow 110 is preferably 1 to 0.1:0.1 to 1. This can prepare a yellow ink composition which can realize good color reproduction of yellow images.

The content of the C.I. Pigment Yellow 128 in the ink composition according to the present invention and the content of C.I. Pigment Yellow 110 in the ink composition according to the present invention may be properly determined, however, the content is preferably about 1 to 5% by weight, more preferably 1.5 to 4% by weight, based on the ink composition.

The yellow ink composition according to the present invention basically comprises the above yellow pigments and may further comprise a dispersant, a surfactant, water, a water-soluble organic solvent, a penetrating agent, and other optional ingredients.

Dispersant/surfactant

According to a preferred embodiment of the present invention, the yellow pigments are added, to ink, as a pigment dispersion which is dispersed the yellow pigments in an aqueous medium with the aid of a dispersant or a surfactant. Preferred dispersants are dispersants commonly used in the preparation of pigment dispersions, for example, polymeric dispersants.

Examples of preferred dispersants include cationic dispersants, anionic dispersants, and nonionic dispersants. Examples of anionic dispersants include polyacrylic acid, polymethacrylic acid, acrylic acid/acrylonitrile copolymer, vinyl acetate/acrylic ester copolymer, acrylic acid/acrylic alkyl ester copolymer, styrene/acrylic acid copolymer, styrene/methacrylic acid copolymer, styrene/acrylic acid/ acrylic alkyl ester copolymer, styrene/methacrylic acid/ acrylic alkyl ester copolymer, styrene/α-methylstyrene/ acrylic acid copolymer, styrene/α-methylstyrene/acrylic acid/acrylic alkyl ester copolymer, styrene/maleic acid copolymer, vinylnaphthalene/maleic acid copolymer, vinyl acetate/ethylene copolymer, vinyl acetate/fatty acid vinylethylene copolymer, vinyl acetate/maleic ester copolymer, vinyl acetate/crotonic acid copolymer, and vinyl acetate/ acrylic acid copolymer. Examples of anionic sufactants include sodium dodecylbenzenesulfonate, sodium laurylate, and ammonium salt of polyoxyethylene alkyl ether sulfates. Examples of nonionic surfactants include polyoxyethylene alkyl ethers, polyoxyethylene alkyl esters, polyoxyethylene sorbitan fatty acid esters, polyoxyethylene alkylphenyl ethers, polyoxyethylenealkylamines, and polyoxyethylene-alkylamides. They may be used alone or as a combination of two or more. According to a preferred embodiment of the present invention, the utilization of a water-soluble styrene-(meth)acrylic acid resin as a dispersant is preferred.

Water and Water-soluble Organic Solvent

The yellow ink composition according to the present invention contains water or a water-soluble organic solvent as a solvent. Examples of water-soluble organic solvents include high-boiling organic solvents. High-boiling organic solvents function to prevent drying of the ink composition and thus to prevent clogging of the head.

Examples of preferred high-boiling organic solvents include: polyhydric alcohols, such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone and N-methyl-2-pyrrolidone; 1,3-dimethyl-2-imidazolidinone; and triethanolamine. Although the amount of the high-boiling organic solvent added is not particularly limited, it is preferably about 0.1 to 30% by weight, more preferably about 0.5 to 20% by weight, based on the ink composition.

The ink composition may further contain a low-boiling organic solvent as a water-soluble organic solvent. Examples of preferred low-boiling organic solvents usable herein include methanol, ethanol, n-propyl alcohol, iso-propyl alcohol, n-butanol, sec-butanol, tert-butanol, iso-butanol, and n-pentanol. Particularly preferred are monohydric alcohols. The low-boiling organic solvent has the effect of shortening the time required for drying ink.

Penetrating Agent

According to a preferred embodiment of the present invention, the ink composition may further contain a penetrating agent. Penetrating agents usable herein include various surfactants, such as anionic, cationic, and amphoteric surfactants; alcohols, such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether. In particular, the utilization of diethylene glycol monobutyl ether or triethylene glycol monobutyl ether is preferred. The amount of the penetrating agent added may be properly determined. However, the amount of the penetrating agent added is preferably about 1 to 20% by weight, more preferably about 1 to 10% by weight, based on the ink composition.

Further examples of penetrating agents include acetylene glycol compounds represented by formula (I):

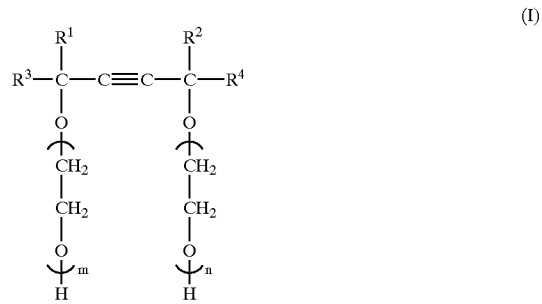

wherein $R^1$, $R^2$, $R^3$, and $R^4$ each independently represent an alkyl group, preferably a straight-chain or branched $C_{1-6}$ alkyl group; and n+m is 0 to 50.

Commercially available products may also be used as the acetylene glycol compound represented by the above formula. Specific examples thereof include OLFINE Y, Surfynol 82, Surfynol 440, Surfynol 465, and Surfynol 485 (all the above products being manufactured by Air Products and Chemicals Inc.). In particular, the utilization of Surfynol 465 is preferred. They may be used alone or as a combination of two or more. The amount of the penetrating agent added is preferably about 0.1 to 5% by weight, more preferably 0.5 to 2% by weight, based on the ink composition.

Other Optional Ingredients

If necessary, the ink composition according to the present invention may further contain other dispersants, other surfactants, saccharides, pH adjustors, preservatives, antimolds, phosphorus-based antioxidants and the like.

Production Process of Ink Composition

The ink composition according to the present invention may be prepared by dispersing and mixing the above ingredients together by means of a suitable method. A preferred production process is as follows. A pigment, a polymeric dispersant, and water are first mixed together by means of a suitable dispergator (for example, a ball mill, a sand mill, an attritor, a roll mill, an agitator mill, a Henschel mixer, a colloid mill, an ultrasonic homogenizer, a jet mill, or an angmill) to prepare a homogeneous pigment dispersion. Subsequently, water, a water-soluble organic solvent, a saccharide, a pH adjustor, a preservative, an antimold and the like are added to the pigment dispersion, followed by satisfactory dissolution to prepare an ink solution. After the thorough stirring, the mixture is filtered to remove coarse particles and foreign matter causative of nozzle clogging to prepare a contemplated ink composition.

Color Ink Set

According to a first aspect of the present invention, there is provided an ink set comprising the above yellow ink composition and the above cyan ink composition, the above magenta ink composition, or the above black ink composition. When printing is performed using the ink set according to the present invention onto recording media, color images can be realized which possess excellent color reproduction and lightfastness.

The cyan pigment, the magenta pigment, and the black pigment used in the ink compositions constituting the ink set according to the present invention are not particularly limited, and any of inorganic and organic pigments may be used. Inorganic pigments include, in addition to titanium oxide and iron oxide, carbon blacks produced by known processes, such as contact, furnace, and thermal processes. Organic pigments usable herein include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye-type chelate pigment (for example, basic dye-type chelate pigments and acid dye-type chelate pigments), nitro pigments, nitroso pigments, and aniline black.

Pigments for cyan inks include C.I. Pigment Blue 1, C.I. Pigment Blue 2, C.I. Pigment Blue 3, C.I. Pigment Blue 15:3, C.I. Pigment Blue 15:34, C.I. Pigment Blue 16, C.I. Pigment Blue 22, C.I. Pigment Blue 60, C.I. Pigment Vat Blue 4, and C.I. Pigment Vat Blue 60. Preferred are C.I. Pigment Blue 15:3 and C.I. Pigment Blue 15:34 with C.I. Pigment Blue 15:3 being more preferred.

Pigments for magenta inks include C.I. Pigment Red 5, C.I. Pigment Red 7, C.I. Pigment Red 12, C.I. Pigment Red 48 (Ca), C.I. Pigment Red 48 (Mn), C.I. Pigment Red 57 (Ca), C.I. Pigment Red57:1, C.I. Pigment Red 112, C.I. Pigment Red 122, C.I. Pigment Red 123, C.I. Pigment Red 168, C.I. Pigment Red 184, and C.I. Pigment Red202. Preferred are C.I. Pigment Red 122, C.I. Pigment Red 168, C.I. Pigment Red 184, and C.I. Pigment Red 202 with C.I. Pigment Red 122 being more preferred.

Carbon blacks usable for black inks include: carbon blacks manufactured by Mitsubishi Chemical Corporation, for example, No. 2300, No. 900, MCF 88, No. 33, No. 40, No. 45, No. 52, MA 7, MA 8, MA 100, and No. 2200 B; carbon blacks manufactured by Columbian Carbon Co., Ltd., for example, Raven 5750, Raven 5250, Raven 5000, Raven 3500, Raven 1255, and Raven 700; carbon blacks manufactured by Cabot Corporation, for example, Regal 400 R, Regal 330 R, Regal 660 R, Mogul L, Monarch 700, Monarch 800, Monarch 880, Monarch 900, Monarch 1000, Monarch 1100, Monarch 1300, and Monarch 1400; and carbon blacks manufactured by Degussa, for example, Color Black FW 1, Color Black FW 2, Color Black FW 2 V, Color Black Fw 18, Color Black FW 200, Color Black S 150, Color Black S 160, Color Black S 170, Printex 35, Printex U, Printex V, Printex 140 U, Special Black 6, Special Black 5, Special Black 4A, and Special Black 4.

The content of the cyan pigment, the content of the magenta pigment, and the content of the black pigment each are preferably about 1 to 5% by weight, more preferably 1.5 to 4% by weight, based on the ink composition.

The ink compositions may further contain a dispersant, a surfactant, water, a water-soluble organic solvent, a penetrating agent, and other optional ingredients. The type and amount of these optional additives may be the same as those described above in connection with the yellow ink composition. Further, each of the ink compositions may be produced in the same manner as described above in connection with the yellow ink composition.

B. Yellow Ink Set According to Second Aspect of Present Invention

According to the second aspect of the present invention, there is provided a yellow ink set which basically comprises a first yellow ink composition and a second yellow ink composition. The first yellow ink composition comprises C.I. Pigment Yellow 128 as a colorant, and the second yellow ink composition comprises C.I. Pigment Yellow 110 as a colorant. The formation of images using a combination of two ink compositions respectively containing these pigments can realize yellow images possessing excellent color reproduction and lightfastness. In particular, when a combination of the two ink compositions is properly selected, C.I. Pigment Yellow 128 can reproduce yellow images assuming a green color while C.I. Pigment Yellow 110 can reproduce yellow images assuming a red color. A more proper combination of the two ink compositions can faithfully reproduce yellow images more close to a yellow color.

According to the present invention, the amount of the C.I. Pigment Yellow 128 as the colorant added is preferably about 1 to 5% by weight, more preferably 1.5 to 4% by weight, based on the first yellow ink composition. The amount of the C.I. Pigment Yellow 110 as the colorant added is preferably about 1 to 5% by weight, more preferably 1.5 to 4% by weight, based on the second yellow ink composition.

The first yellow ink composition and the second yellow ink composition may further contain a dispersant, a surfactant, water, a water-soluble organic solvent, a penetrating agent, and other optional ingredients. The type and amount of these optional additives may be the same as those described above in connection with the first aspect of the present invention. Further, each of the ink compositions may be produced in the same manner as described above in connection with the first aspect of the present invention.

C. Color Ink Set According to Third Aspect of Present Invention

According to the third aspect of the present invention, there is provided a color ink set comprising a combination of the above-described first and second yellow ink compositions with one or two or more of a cyan ink composition, a magenta ink composition, and a black ink composition. The color ink set may be used in the formation of color images.

The formation of images using a combination of the above-described two yellow ink compositions and cyan ink composition can realize green images possessing excellent color reproduction and lightfastness. In particular, properly selecting a combination of the above ink compositions can offer the following advantage. For example, when the amount of the yellow ink composition is large, green images assuming a yellow color can be reproduced. On the other hand, when the amount of the cyan ink composition is large, green images assuming a blue color can be reproduced. More proper selection of both the color ink compositions can realize the reproduction of good green images more close to a green color.

The formation of images using a combination of the above-described two yellow ink compositions and magenta ink composition can realize orange images possessing excellent color reproduction and lightfastness. In particular, properly selecting a combination of the above ink compositions can offer the following advantage. When the amount of the yellow ink composition is large, orange images assuming a yellow color can be yielded. On the other hand, when the amount of the magenta ink composition is large, orange images assuming a red color can be yielded. Proper selection of both the color ink compositions can realize the reproduction of good orange images more close to an orange color.

According to a preferred embodiment of the present invention, the ink set comprises the above-described first and second yellow ink compositions, cyan ink composition, magenta ink composition, and black ink composition. When printing is performing using this ink set on recording media, good color images can be produced.

For the cyan ink composition, the magenta ink composition, and the black ink composition, the ingredients, the production process and the like may be the same as those described above in connection with the first aspect of the present invention.

Recording Method

The ink set according to the present invention may be used in image recording methods using an ink composition. Recording methods using an ink composition include, for example, an ink jet recording method, screen printing, a recording method using writing utensils, such as pens, and other various printing methods. In particular, the ink composition according to the present invention is preferably used in an ink jet recording method wherein droplets of an ink composition are ejected and deposited onto a recording medium to perform printing. The use of the ink jet recording method permits printing to be performed on recording media through a proper combination of ink compositions constituting the ink set according to the present invention. This can realize the formation of images having a wide range of color reproduction and good lightfastness.

EXAMPLE

The present invention will be described in more detail with reference to the following examples. However, these examples should not be construed as limiting the scope of the present invention.

The unit "duty" used herein refers to a unit of a value D defined and calculated by equation (I):

$$D = \frac{\text{number of actually printed dots}}{\text{longitudinal resolution} \times \text{transverse resolution}} \times 100 \text{ (duty)} \quad (I)$$

Preparation of Ink Composition A

Pigment-based ink compositions composed of the following ingredients were prepared according to the following procedure. The pigment and the dispersant resin were first mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed. The other additives were added, and the mixture was stirred at room temperature for 20 min. The mixture was then filtered through a 5-μm membrane filter to prepare an ink composition.

| Yellow ink composition A1 | |
| --- | --- |
| C.I. Pigment Yellow 110 | 2.1 wt % |
| C.I. Pigment Yellow 128 | 2.5 wt % |
| Dispersant (styrene/acrylic acid copolymer) | 1.8 wt % (solid basis) |
| Glycerin | 15 wt % |
| Triethanolamine | 0.2 wt % |
| Ethylene glycol | 4 wt % |
| Surfynol 465 | 1 wt % |
| Triethylene glycol monobutyl ether | 4 wt % |
| Pure water | Balance |
| Yellow ink composition A2 | |
| C.I. Pigment Yellow 110 | 2.5 wt % |
| C.I. Pigment Yellow 128 | 2.2 wt % |
| Dispersant (styrene/acrylic acid copolymer) | 1.4 wt % (solid basis) |
| Glycerin | 12 wt % |
| Triethanolamine | 0.9 wt % |
| Diethylene glycol | 5 wt % |
| Surfynol 465 | 1 wt % |
| Triethylene glycol monobutyl ether | 4 wt % |
| Pure water | Balance |

-continued

| Yellow ink composition A3 | |
| --- | --- |
| C.I. Pigment Yellow 110 | 2.5 wt % |
| C.I. Pigment Yellow 128 | 1.9 wt % |
| Dispersant (styrene/acrylic acid copolymer) | 1.5 wt % (solid basis) |
| Glycerin | 10 wt % |
| Triethanolamine | 0.8 wt % |
| Ethylene glycol | 5 wt % |
| Surfynol 465 | 1 wt % |
| Triethylene glycol monobutyl ether | 5 wt % |
| Pure water | Balance |
| Cyan ink composition A | |
| C.I. Pigment Blue 15:3 | 2.1 wt % |
| Dispersant (styrene/acrylic acid copolymer) | 0.8 wt % (solid basis) |
| Glycerin | 18 wt % |
| Diethylene glycol | 7 wt % |
| Triethanolamine | 0.7 wt % |
| Surfynol 465 | 1 wt % |
| Pure water | Balance |
| Magenta ink composition A | |
| C.I. Pigment Red 122 | 3.4 wt % |
| Dispersant (styrene/acrylic acid copolymer) | 1.5 wt % (solid basis) |
| Glycerin | 15 wt % |
| Ethylene glycol | 7 wt % |
| Triethanolamine | 0.7 wt % |
| Surfynol 465 | 0.8 wt % |
| Triethylene glycol monobutyl ether | 5 wt % |
| Pure water | Balance |
| Black ink composition A | |
| Carbon Black | 2.1 wt % |
| Dispersant (styrene/acrylic acid copolymer) | 0.5 wt % (solid basis) |
| Glycerin | 15 wt % |
| Ethylene glycol | 5 wt % |
| Triethanolamine | 0.7 wt % |
| Surfynol 465 | 1 wt % |
| Diethylene glycol monobutyl ether | 8 wt % |
| Pure water | Balance |

Print Evaluation Test A

The ink compositions prepared above were printed on a specialty recording medium for ink jet recording (a specialty glossy film, manufactured by Seiko Epson Corporation) by means of an ink jet printer "MJ-930C," manufactured by Seiko Epson Corporation, under conditions of a weight of ink ejected of 0.040 μg per dot and a resolution of 360 dpi×360 dpi.

Ink sets comprised of the yellow ink compositions A1 to A3, the black ink composition A, the magenta ink composition A, and the cyan ink composition A were provided. This ink sets were used to print yellow, green, and red images. The ink compositions constituting the ink sets (Examples 1 to 9) used for printing were as shown in Table A1 below.

TABLE A1

| Ink composition/example | 1 | 2 | 3 | 4 | 5 | 6 | 7 | 8 | 9 |
| --- | --- | --- | --- | --- | --- | --- | --- | --- | --- |
| Yellow ink composition A1 | ○ | | | ○ | ○ | | | | |
| Yellow ink composition A2 | | ○ | | | | ○ | ○ | | |
| Yellow ink composition A3 | | | ○ | | | | | ○ | ○ |
| Cyan ink composition A | | | | ○ | | ○ | | ○ | |
| Magenta ink composition A | | | | | ○ | | ○ | | ○ |
| Black ink composition A | | | | | | | | | |

Color Reproduction Evaluation A

For the hue of the images produced in the above examples, the coordinates of the L*a*b* color system of the color difference indication method specified in CIE (Commission International de l'Eclairage) were determined using a Macbeth CE-7000 spectrophotometer (manufactured by Macbeth), and the images were evaluated based on the chroma C* value defined by equation (II):

$$C^*=[(a^*)^2+(b^*)^2]^{1/2} \quad (II)$$

There is a difference in hue of coloring material between genuine dye inks and the ink compositions of the present invention. In order to perform genuine comparison between both the inks, for each ink composition, the chroma C* value was determined and was used as quantitative value for evaluation. The evaluation results were as shown in Table A2 below. In Table A2, the value of MJ-930C is the chroma values of genuine dye inks.

TABLE A2

|  | Yellow | Green | Red |
|---|---|---|---|
| MJ-930 C | 95.1 | 68.0 | 96.0 |
| Example 1 | 100 |  |  |
| Example 2 | 99.0 |  |  |
| Example 3 | 99.1 |  |  |
| Example 4 |  | 82.3 |  |
| Example 5 |  |  | 96.8 |
| Example 6 |  | 81.2 |  |
| Example 7 |  |  | 97.4 |
| Example 8 |  | 79.8 |  |
| Example 9 |  |  | 98.1 |

As is apparent from the results shown in Table A2 above, images obtained in Examples have high chroma over all the regions. This indicates that the use of the ink set according to the present invention can produce high-quality color images having a high level of color reproduction over a wide range.

Lightfastness Evaluation A

Blotted images (100% duty) were printed using ink sets of Examples 1 to 3. The prints thus obtained were evaluated for lightfastness under the following conditions.

At the outset, a xenon weather-o-meter Ci35A manufactured by Atlas was used for light irradiation, and the prints were exposed to light under conditions of black panel temperature 630C, relative humidity 50%, and ultraviolet light (340 nm) irradiance of 0.35 W/m². The dose was 360 kJ/m² (light irradiation under the above conditions for 248 hr) or 720 kJ/m² (light irradiation under the above conditions for 568 hr).

After the irradiation, the reflection density of the prints was measured with a spectrophotometer GRETAG SPM (manufactured by GRETAG) under conditions of light source D50, provision of no light source filter, absolute white as reference white, and angle of visibility 20. The retention of density was evaluated according to the following criteria. The evaluation results were as shown in Table A3 below.

A: More than 90%
B: 80 to 90%
C: Less than 80%

TABLE A3

|  | 360 kJ/m² | 720 kJ/m² |
|---|---|---|
| Example 1 | A | A |
| Example 2 | A | A |
| Example 3 | A | A |

Preparation of Ink Composition B

Pigment-based ink compositions composed of the following ingredients were prepared according to the following procedure. The pigment and the dispersant resin were first mixed together, and the mixture, together with glass beads (diameter: 1.7 mm, amount: 1.5 times (by weight) larger than the mixture), was dispersed for 2 hr in a sand mill (manufactured by Yasukawa Seisakusho). Thereafter, the glass beads were removed. The other additives were added, and the mixture was stirred at room temperature for 20 min. The mixture was then filtered through a 5-$\mu$m membrane filter to prepare an ink composition.

Yellow ink composition B1

| C.I. Pigment Yellow 128 | 4.1 wt % |
|---|---|
| Dispersant (styrene/acrylic acid copolymer) | 1.5 wt % (solid basis) |
| Glycerin | 15 wt % |
| Monoethanolamine | 0.2 wt % |
| Ethylene glycol | 4 wt % |
| Surfynol 465 | 1 wt % |
| Triethylene glycol monobutyl ether | 5 wt % |
| Pure water | Balance |

Yellow ink composition B2

| C.I. Pigment Yellow 110 | 3.5 wt % |
|---|---|
| Dispersant (styrene/acrylic acid copolymer) | 1.0 wt % (solid basis) |
| Glycerin | 16 wt % |
| Triethanolamine | 0.7 wt % |
| Diethylene glycol | 5 wt % |
| Surfynol 465 | 1 wt % |
| Triethylene glycol monobutyl ether | 4 wt % |
| Pure water | Balance |

Yellow ink composition B3

| C.I. Pigment Yellow 128 | 3.5 wt % |
|---|---|
| Dispersant (styrene/acrylic acid copolymer) | 1.2 wt % (solid basis) |
| Glycerin | 10 wt % |
| Triethanolamine | 0.8 wt % |
| Ethylene glycol | 5 wt % |
| Surfynol 465 | 1 wt % |
| Triethylene glycol monobutyl ether | 5 wt % |
| Pure water | Balance |

Yellow ink composition B4

| C.I. Pigment Yellow 110 | 3.8 wt % |
|---|---|
| Dispersant (styrene/acrylic acid copolymer) | 1.0 wt % (solid basis) |
| Glycerin | 14 wt % |
| Ethylene glycol | 8 wt % |
| Triethanolamine | 0.9 wt % |
| Surfynol 465 | 1 wt % |
| Triethylene glycol monobutyl ether | 5 wt % |
| Pure water | Balance |

Cyan ink composition B

| C.I. Pigment Blue 15:3 | 2.1 wt % |
|---|---|
| Dispersant (styrene/acrylic acid copolymer) | 0.8 wt % (solid basis) |
| Glycerin | 18 wt % |
| Diethylene glycol | 7 wt % |
| Triethanolamine | 0.7 wt % |
| Surfynol 465 | 1 wt % |
| Pure water | Balance |

Magenta ink composition B

| C.I. Pigment Red 122 | 3.4 wt % |
|---|---|
| Dispersant (styrene/acrylic acid copolymer) | 1.5 wt % (solid basis) |
| Glycerin | 15 wt % |
| Ethylene glycol | 7 wt % |
| Triethanolamine | 0.7 wt % |
| Surfynol 465 | 0.8 wt % |
| Triethylene glycol monobutyl ether | 5 wt % |
| Pure water | Balance |

-continued

| Black ink composition B | |
|---|---|
| Carbon Black | 2.1 wt % |
| Dispersant (styrene/acrylic acid copolymer) | 0.5 wt % (solid basis) |
| Glycerin | 15 wt % |
| Ethylene glycol | 5 wt % |
| Triethanolamine | 0.7 wt % |
| Surfynol 465 | 1 wt % |
| Diethylene glycol monobutyl ether | 8 wt % |
| Pure water | Balance |

Print Evaluation Test B

The ink compositions prepared above were printed on a specialty recording medium for ink jet recording (a specialty glossy film, manufactured by Seiko Epson Corporation) by means of an ink jet printer "MJ-930C," manufactured by Seiko Epson Corporation, under conditions of a weight of ink ejected of 0.040 μg per dot and a resolution of 360 dpi×360 dpi.

Ink sets comprised of the yellow ink compositions B1 to B4, the black ink composition, the magenta ink composition, and the cyan ink composition were provided. This ink sets were used to print yellow, green, and red images. The ink compositions constituting the ink sets (Examples 1 to 6) used for printing were as shown in Table B1 below.

TABLE B1

| Ink composition/example | 1 | 2 | 3 | 4 | 5 | 6 |
|---|---|---|---|---|---|---|
| Yellow ink composition B1 | ○ | | ○ | | | |
| Yellow ink composition B2 | ○ | | | | ○ | |
| Yellow ink composition B3 | | ○ | | ○ | | |
| Yellow ink composition B4 | | ○ | | | | ○ |
| Cyan ink composition B | | | ○ | ○ | | |
| Magenta ink composition B | | | | | ○ | ○ |
| Black ink composition B | | | | | | |

Color Reproduction Evaluation B

For the hue of the images produced in the above examples, the coordinates of the L*a*b* color system of the color difference indication method specified in CIE (Commission International de l'Eclairage) were determined using a Macbeth CE-7000 spectrophotometer (manufactured by Macbeth), and the images were evaluated based on the chroma C* value defined by equation (II):

$$C^* = [(a^*)^2 + (b^*)^2]^{1/2} \quad (II)$$

There is a difference in hue of coloring material between genuine dye inks and the ink compositions of the present invention.

In order to perform genuine comparison between both the inks, for each ink composition, the chroma C* value was determined and was used as quantitative value for evaluation. The evaluation results were as shown in Table B2 below. In Table B2, the value of MJ-930C is the chroma values of genuine dye inks.

TABLE B2

| | Yellow | Green | Red |
|---|---|---|---|
| MJ-930 C | 95.1 | 68.0 | 96.0 |
| Example 1 | 102 | | |
| Example 2 | 99.0 | | |
| Example 3 | | 80.9 | |
| Example 4 | | 82.7 | |
| Example 5 | | | 99.9 |
| Example 6 | | | 101 |

As is apparent from the results shown in Table B2 above, images obtained in Examples have high chroma over all the regions. This indicates that the use of the ink set according to the present invention can produce high-quality images having a high level of color reproduction over a wide range.

Lightfastness Evaluation B

Blotted images (100% duty) were printed using ink sets of Examples 1 to 6. The prints thus obtained were evaluated for lightfastness under the following conditions.

At the outset, a xenon weather-o-meter Ci35A manufactured by Atlas was used for light irradiation, and the prints were exposed to light under conditions of black panel temperature 63° C., relative humidity 50%, and ultraviolet light (340 nm) irradiance of 0.35 W/m$^2$. The dose was 360 kJ/m$^2$ (light irradiation under the above conditions for 248 hr) or 720 kJ/m$^2$ (light irradiation under the above conditions for 568 hr).

After the irradiation, the reflection density of the prints was measured with a spectrophotometer GRETAG SPM (manufactured by GRETAG) under conditions of light source D50, provision of no light source filter, absolute white as reference white, and angle of visibility 20. The retention of density was evaluated according to the following criteria. The evaluation results were as shown in Table B3 below.

A: More than 90%
B: 80 to 90%
C: Less than 80%

TABLE 3

| | 360 kJ/m$^2$ | 720 kJ/m$^2$ |
|---|---|---|
| Example 1 | A | A |
| Example 2 | A | A |
| Example 3 | A | A |
| Example 4 | A | A |
| Example 3 | A | A |
| Example 4 | A | A |

What is claimed is:

1. A yellow ink composition comprising at least C.I. Pigment Yellow 128 and C.I. Pigment Yellow 110 as a colorant and a dispersant comprising a water-soluble styrene-(meth) acrylic resin.

2. The ink composition according to claim 1, wherein the weight ratio of C.I. Pigment Yellow 128 to C.I. Pigment Yellow 110 is 1 to 0.1: 0.1 to 1.

3. The ink composition according to claim 1, wherein the content of the colorant is 1 to 5% by weight based on the ink composition.

4. The ink composition according to claim 1, which comprises a dispersant and or a penetrating agent.

5. The ink composition according to claim 4, wherein the penetrating agent is a lower alkyl ether of a polyhydric alcohol and/or an acetylene glycol compound.

6. The ink composition according to claim 5, wherein the content of the lower alkyl ether of polyhydric alcohol is 1 to 20% by weight based on the ink composition.

7. The ink composition according to claim 5, wherein the content of the acetylene glycol compound is 0.1 to 5% by weight based on the ink composition.

8. The ink composition according to claim 6, wherein the lower alkyl ether of polyhydric alcohol is diethylene glycol monobutyl ether or triethylene glycol monobutyl ether.

9. The ink composition according to claim 5, wherein the acetylene glycol compound is a compound represented by formula (I):

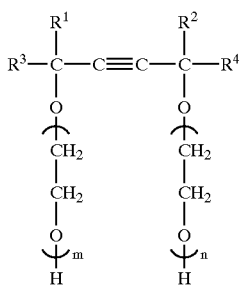

wherein $R^1$, $R^2$, $R^3$, and $R^4$ each independently represent a $C_{1-6}$ alkyl group and n+m is 0 to 50.

10. A recording method comprising the step of depositing the ink composition according to claim 1 onto a recording medium to perform printing.

11. The recording method according to claim 10, which is an ink jet recording method comprising the steps of: ejecting droplets of an ink composition; and depositing the droplets onto a recording medium to perform printing.

12. A record produced by the recording method according to claim 10.

13. An ink set comprising a yellow ink composition and a cyan ink composition, a magenta ink composition, or a black ink composition, said yellow ink composition being the ink composition according to claim 1.

14. The ink set according to claim 13, wherein the cyan ink composition comprises C.I. Pigment Blue 15:3 as a colorant, the magenta ink composition comprises C.I. Pigment Red 122, C.I. Pigment Red 168, C.I. Pigment Red 184, or C.I. Pigment Red 202 as a colorant, and the black ink composition comprises carbon black as a colorant.

15. A recording method comprising the step of depositing an ink composition onto a recording medium to perform printing, the ink composition being an ink composition in the ink set according to claim 14.

16. The recording method according to claim 15, which is an ink jet recording method comprising the steps of: ejecting droplets of an ink composition; and depositing the droplets onto a recording medium to perform printing.

17. A record produced by the recording method according to claim 15.

18. An ink set comprising a first yellow ink composition and a second yellow ink composition, wherein the first yellow ink composition comprises C.I. Pigment Yellow 128 as a colorant, and the second yellow ink composition comprises C.I. Pigment Yellow 110 as a colorant.

19. The ink set according to claim 18, which further comprises a cyan ink composition, a magenta ink composition, or a black ink composition.

20. The ink set according to claim 19, wherein the cyan ink composition comprises C.I. Pigment Blue 15:3 as a colorant, the magenta ink composition comprises C.I. Pigment Red 122, C.I. Pigment Red 168, C.I. Pigment Red 184, or C.I. Pigment Red 202 as a colorant, or the black ink composition comprises carbon black as a colorant.

21. The ink set according to claim 18, wherein the content of the colorant in the ink composition is 1 to 5% by weight based on the ink composition.

22. The ink set according to claim 18, wherein the ink composition comprises a dispersant and/or a penetrating agent.

23. The ink set according to claim 22, wherein the dispersant is a water-soluble styrene-(meth) acrylic resin.

24. The ink set according to claim 22, wherein the penetrating agent is a lower alkyl ether of a polyhydric alcohol and/or an acetylene glycol compound.

25. The ink set according to claim 24, wherein the content of the lower alkyl ether of polyhydric alcohol is 1 to 20% by weight based on the ink composition.

26. The ink set according to claim 24, wherein the content of the acetylene glycol compound is 0.1 to 5% by weight based on the ink composition.

27. The ink set according to claim 24, wherein the lower alkyl ether of polyhydric alcohol is diethylene glycol monobutyl ether or triethylene glycol monobutyl ether.

28. The ink set according to claim 24, wherein the acetylene glycol compound is a compound represented by formula (I):

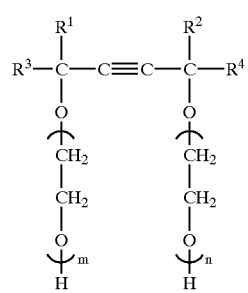

wherein $R^1$, $R^2$, $R^3$, and $R^4$ each independently represent a $C_{1-6}$ alkyl group; and n+m is o to 50.

29. A recording method comprising the step of depositing the ink composition in the ink set according to claim 18 onto a recording medium to perform printing.

30. A The recording method according to claim 29, which is an ink jet recording method comprising the steps of: ejecting droplets of an ink composition; and depositing the droplets onto a recording medium to perform printing.

31. A record produced by the recording method according to claim 29.

* * * * *